(12) United States Patent
Sakai et al.

(10) Patent No.: US 10,122,013 B2
(45) Date of Patent: Nov. 6, 2018

(54) CATHODE ACTIVE MATERIAL AND PROCESS FOR ITS PRODUCTION

(71) Applicant: SUMITOMO CHEMICAL CO., LTD., Tokyo (JP)

(72) Inventors: Tomohiro Sakai, Tokyo (JP); Kentaro Tsunozaki, Tokyo (JP); Michinori Suehara, Tokyo (JP)

(73) Assignee: SUMITOMO CHEMICAL CO., LTD., Tokyo (JP)

( * ) Notice: Subject to any disclaimer, the term of this patent is extended or adjusted under 35 U.S.C. 154(b) by 412 days.

(21) Appl. No.: 14/663,033

(22) Filed: Mar. 19, 2015

(65) Prior Publication Data

US 2015/0200394 A1    Jul. 16, 2015

Related U.S. Application Data

(63) Continuation of application No. PCT/JP2013/079291, filed on Oct. 29, 2013.

(30) Foreign Application Priority Data

Oct. 29, 2012  (JP) .................................. 2012-238274

(51) Int. Cl.
| | |
|---|---|
| H01M 4/505 | (2010.01) |
| H01M 4/525 | (2010.01) |
| H01M 4/04 | (2006.01) |
| H01M 10/052 | (2010.01) |
| H01M 4/02 | (2006.01) |

(52) U.S. Cl.
CPC ......... H01M 4/505 (2013.01); H01M 4/0471 (2013.01); H01M 4/0497 (2013.01); H01M 4/525 (2013.01); H01M 10/052 (2013.01); H01M 2004/028 (2013.01)

(58) Field of Classification Search
CPC ........ H01M 4/505; H01M 4/04; H01M 4/525; H01M 4/0497; H01M 4/0471; H01M 2004/028; H01M 10/052
See application file for complete search history.

(56) References Cited

U.S. PATENT DOCUMENTS

2007/0292764 A1* 12/2007 Soma .................... H01M 4/131
                                                                   429/231.1
2008/0113267 A1*  5/2008 Jouanneau ......... C01G 45/1221
                                                                   429/224
2008/0254368 A1* 10/2008 Ooyama ................ H01M 4/133
                                                                   429/223
2010/0173197 A1*  7/2010 Li ....................... C01G 45/1228
                                                                   429/220
2011/0217592 A1*  9/2011 Gunji ....................... H01M 4/48
                                                                   429/218.1

FOREIGN PATENT DOCUMENTS

| CN | 101355159 | * | 1/2009 |
|---|---|---|---|
| CN | 101355159 | A | 1/2009 |
| JP | 2007-335331 | | 12/2007 |
| JP | 2008-530747 | | 8/2008 |
| JP | 2008-251434 | | 10/2008 |
| JP | 2009-152114 | | 7/2009 |
| JP | 2011-187190 | | 9/2011 |
| WO | WO 2012/038270 A2 | | 3/2012 |
| WO | WO 2012/124256 A1 | | 9/2012 |

OTHER PUBLICATIONS

WO2012124256 MT.*
WO2012038270MT.*
2013079291,Decision_to_Grant_a_Patent_(Translated),Feb. 7, 2017.*
2014544525,Decision_to_Grant_a_Patent_(Translated),Apr. 24, 2018.*
International Search Report issued in International Application No. PCT/JP2013/079291, dated Feb. 4, 2014.

* cited by examiner

*Primary Examiner* — Alexander Usyatinsky
(74) *Attorney, Agent, or Firm* — Oblon, McClelland, Maier & Neustadt, L.L.P.

(57) ABSTRACT

To provide a cathode active material having excellent cycle characteristics and a small decrease in the discharge voltage, and a process for its production.
A process for producing a cathode active material, which comprises a step of mixing at least one sulfate (A) selected from the group consisting of a sulfate of Ni, a sulfate of Co and a sulfate of Mn with at least one carbonate (B) selected from the group consisting of sodium carbonate and potassium carbonate in an aqueous solution state to obtain a coprecipitated compound, a step of mixing the coprecipitated compound with an aqueous phosphate solution, a step of volatilizing a water content from the mixture of the coprecipitated compound and the aqueous phosphate solution to obtain a precursor compound, and a step of mixing the precursor compound with lithium carbonate and firing the mixture at from 500 to 1000° C.; and a cathode active material obtainable by the production process, which comprises Li, at least one transition metal element (X) selected from the group consisting of Ni, Co and Mn, and P, wherein the average coefficient of variation (CV value) of the calculated peak intensity ratio (Ip/Ix) of P to the transition metal element (X) is from 0 to 20% as determined by a method for measuring coefficient of variation.

14 Claims, 1 Drawing Sheet

CATHODE ACTIVE MATERIAL AND PROCESS FOR ITS PRODUCTION

This application is a continuation of PCT Application No. PCT/JP2013/079291, filed on Oct. 29, 2013, which is based upon and claims the benefit of priority from Japanese Patent Application No. 2012-238274 filed on Oct. 29, 2012. The contents of those applications are incorporated herein by reference in their entireties.

TECHNICAL FIELD

The present invention relates to a process for producing a cathode active material, a cathode for a lithium ion secondary battery, and a lithium ion secondary battery.

BACKGROUND ART

Lithium ion secondary batteries are widely used for portable electronic instruments such as cell phones and notebook-size personal computers. As a cathode active material for a lithium ion secondary battery, a cathode active material comprising a composite oxide containing Li and a transition metal element (such as $LiCoO_2$, $LiNiO_2$, $LiNi_{0.8}Co_{0.2}O_2$ or $LiMn_2O_4$) has been known. For example, a lithium ion secondary battery using $LiCoO_2$ as a cathode active material, and using as an anode a lithium alloy, graphite, carbon fibers or the like, which achieves a high voltage of about 4V, is widely used as a battery having a high energy density.

For a lithium ion secondary battery for portable electronic instruments or vehicles, it is desired to reduce the size and weight, and it is desired to further improve the discharge capacity per unit mass (hereinafter referred to simply as "discharge capacity") and such characteristics that the discharge capacity and the average discharge voltage will not substantially decrease after repeating the charge and discharge cycle (hereinafter sometimes referred to as "cycle characteristics").

As a cathode active material having a high discharge capacity, a cathode active material comprising a composite oxide having a high Li ratio relative to the transition metal element (hereinafter sometimes referred to as "Li rich cathode active material") such as the following cathode active material (i) has attracted attention.

(i) A cathode active material which contains a solid solution of a lithium transition metal composite oxide having an α-NaFeO2 crystal structure, wherein the compositional ratio of Li and the transition metal elements contained in the solid solution satisfies a compositional formula of $Li_{1+1/3x}Co_{1-x-y}Ni_{y/2}Mn_{2x/3+y/2}$ (wherein $x+y \leq 1$, $0 \leq y$ and $1/3 < x \leq 2/3$) (Patent Document 1).

However, from the cathode active material (i), Mn is likely to elute into an electrolytic solution by contact with a decomposed product formed from the electrolytic solution by charging at a high voltage. Thus, the crystal structure of the cathode active material (i) tends to be unstable, and no sufficient cycle characteristics are likely to be obtained.

Accordingly, in order to improve the cycle characteristics, the following cathode active materials (ii) and (iii) have been proposed.

(ii) A cathode active material comprising a cathode active material and a layer containing P formed on the surface layer of the cathode active material by bringing the cathode active material into contact with a lithium dihydrogen phosphate solution or a diammonium hydrogen phosphate solution (Patent Document 2).

(iii) A cathode active material having a phosphorus compound incorporated in the vicinity of the surface of a lithium composite oxide, obtained by mixing an oxide or hydroxide containing a transition metal element, a lithium salt and a phosphorus compound containing at least one of $PO_3$ and $PO_4$ and firing the mixture (Patent Document 3).

However, the cathode active materials (ii) and (iii) hardly achieve sufficient cycle characteristics when formed into Li rich cathode active materials.

PRIOR ART DOCUMENTS

Patent Documents

Patent Document 1: JP-A-2009-152114
Patent Document 2: JP-A-2008-530747
Patent Document 3: JP-A-2008-251434

DISCLOSURE OF INVENTION

Technical Problem

The present invention provides a cathode active material having excellent cycle characteristics and a small decrease in the discharge voltage, and a process for its production. Further, the present invention provides a cathode for a lithium ion secondary battery using the cathode active material, and a lithium ion secondary battery having the cathode for a lithium ion secondary battery.

Solution to Problem

The present invention provides the following.
(1) A process for producing a cathode active material, which comprises the following steps (I) to (IV):
    (I) a step of mixing at least one sulfate (A) selected from the group consisting of sulfate of Ni, a sulfate of Co and a sulfate of Mn, with at least one carbonate (B) selected from the group consisting of sodium carbonate and potassium carbonate in an aqueous solution state to obtain a coprecipitated compound containing at least one transition metal element (X) selected from the group consisting of Ni, Co and Mn;
    (II) a step of mixing the coprecipitated compound with an aqueous phosphate solution;
    (III) a step of volatilizing a water content from the mixture of the coprecipitated compound and the aqueous phosphate solution to obtain a precursor compound; and
    (IV) a step of mixing the precursor compound with lithium carbonate and firing the mixture at from 500 to 1000° C.
(2) The process for producing a cathode active material according to the above (1), wherein in the step (I), the concentration of the transition metal element (X) in the aqueous solution of the sulfate (A) is from 0.1 to 3 mol/kg, and the concentration of the carbonate (B) in the aqueous solution of the carbonate (B) is from 0.1 to 2 mol/kg.
(3) The process for producing a cathode active material according to the above (1) or (2), wherein in the step (I), the pH of the solution mixture is from 7 to 12 when the aqueous solution of the sulfate (A) and the aqueous solution of the carbonate (B) are mixed.
(4) The process for producing a cathode active material according to any one of the above (1) to (3), wherein the coprecipitated compound in the step (I) is a carbonate containing Ni and Mn, or a carbonate containing Ni, Co and Mn.
(5) The process for producing a cathode active material according to any one of the above (1) to (4), wherein in the step (I), the coprecipitated compound has a particle size (D50) of from 5 to 20 μm and a specific surface area of from 50 to 300 m²/g.
(6) The process for producing a cathode active material according to any one of the above (1) to (5), wherein the aqueous phosphate solution in the step (II) and the step (III) is an aqueous solution of at least one member selected from the group consisting of phosphoric acid, ammonium dihydrogen phosphate and diammonium hydrogen phosphate.
(7) The process for producing a cathode active material according to any one of the above (1) to (6), wherein in the step (II), the ratio (P/X) of the total number of moles of P contained in the phosphate to the total number of moles of the transition metal element (X) contained in the coprecipitated compound is from 0.01 to 10 mol %.
(8) The process for producing a cathode active material according to any one of the above (1) to (7), wherein in the step (IV), the ratio (Li/X) of the total number of moles of Li contained in the lithium carbonate to the total number of moles of the transition metal element (X) contained in the precursor compound is at least 1.1 times.
(9) A cathode active material comprising Li, at least one transition metal element (X) selected from the group consisting of Ni, Co and Mn, and P, wherein
the average coefficient of variation (CV value) of the calculated peak intensity ratio (Ip/Ix) of P to the transition metal element (X) is from 0 to 20% as determined by the following method for measuring coefficient of variation:
(Method for Measuring Coefficient of Variation)
With respect to three cathode active materials, the cross section of each cathode active material is scanned with an electron probe microanalyzer at 2 μm intervals in a diameter direction with a spot diameter of 2 μm to measure the calculated peak intensity (Ip) of P and the calculated peak intensity (Ix) of the transition metal element (X); and then the calculated peak intensity ratio (Ip/Ix) of P to the transition metal element (X) at each measurement spot is obtained, the coefficients of variation (CV values) of the calculated peak intensity ratio (Ip/Ix) of the respective cathode active materials are calculated, and their average is determined.
(10) The cathode active material according to the above (9), wherein the average calculated peak intensity ratio (Ip/Ix) of each cathode active material is from 0.001 to 0.1 as determined by the above method for measuring coefficient of variation.
(11) The cathode active material according to the above (9) or (10), wherein the ratio (Li/X) of the number of moles of Li to the number of moles of the transition metal element (X) is at least 1.1 times, and the ratio (P/X) of the number of moles of P to the number of moles of the transition metal element (X) is from 0.01 to 10 mol %.
(12) The cathode active material according to any one of the above (9) to (11), which is a compound (1) represented by the following formula (1):

$$Li_{1+a}P_bNi_cCo_dMn_eO_{2+f} \qquad (1)$$

(wherein $0.1 \leq a \leq 0.6$, $0.001 \leq b \leq 0.1$, $0.1 \leq c \leq 0.5$, $0 \leq d \leq 0.3$, $0.2 \leq e \leq 0.9$, $0.9 \leq c+d+e \leq 1.05$ and f is a value determined by the valencies of Li, P, Ni, Co and Mn.)

(13) A cathode for a lithium ion secondary battery, comprising a cathode current collector and a cathode active material layer formed on the cathode current collector, wherein
the cathode active material layer contains the cathode active material as defined in any one of the above (9) to (12), an electrically conductive material and a binder.
(14) A lithium ion secondary battery comprising the cathode for a lithium ion secondary battery as defined in the above (13), an anode and a non-aqueous electrolyte.

Advantageous Effects of Invention

The cathode active material of the present invention has excellent cycle characteristics and a small decrease in the discharge voltage.
According to the process for producing a cathode active material of the present invention, a cathode active material having excellent cycle characteristics and a small decrease in the discharge voltage can be obtained.
By using the cathode for a lithium ion secondary battery of the present invention, a lithium ion secondary battery having excellent cycle characteristics and a small decrease in the discharge voltage can be obtained.
The lithium ion secondary battery of the present invention has excellent cycle characteristics and a small decrease in the discharge voltage.

DESCRIPTION OF EMBODIMENTS

In this specification, Li means lithium element. Further, Ni, Co, Mn, P and the like also mean the respective elements.
<Cathode Active Material>
The cathode active material of the present invention is a cathode active material comprising a composite oxide containing Li, at least one transition metal element (X) selected from the group consisting of Ni, Co and Mn, and P.
The cathode active material of the present invention is in the form of particles. The shape of the particles of the cathode active material is not particularly limited, and may, for example, be a shape of spheres, needles or plates. Particularly, the shape of the particles of the cathode active material is more preferably spherical, whereby the packing efficiency of the cathode active material is high at the time of preparation of a cathode.
The particle size (D50) of the cathode active material of the present invention is preferably from 4 to 20 μm, more preferably from 5 to 18 μm, particularly preferably from 6 to 15 μm. When the particle size (D50) is within the above range, a high discharge capacity will be obtained.
Further, the particle size (D50) means a volume-based accumulative 50% size which is a particle size at a point of 50% on an accumulative volume distribution curve drawn by obtaining the particle size distribution on the volume basis and taking the whole to be 100%. The particle size (D50) is measured by a method disclosed in Examples.
The cathode active material of the present invention is preferably in the form of secondary particles having primary particles having a particle size (D50) of from 10 to 500 nm agglomerated, whereby when a lithium ion secondary battery is prepared, the electrolytic solution is likely to sufficiently diffuse through the cathode active material in the cathode. P is preferably uniformly distributed in the secondary particles, whereby the decrease in the discharge voltage will sufficiently be suppressed.

The specific surface area of the cathode active material of the present invention is preferably from 0.1 to 15 m²/g, more preferably from 2 to 10 m²/g, particularly preferably from 4 to 8 m²/g. When the specific surface area is at least the lower limit, a high discharge capacity will be obtained. When the specific surface area is at most the upper limit, excellent cycle characteristics will be obtained.

The specific surface area may be measured by a method disclosed in Examples.

Of the cathode active material of the present invention, the average coefficient of variation (CV value) of the calculated peak intensity ratio (Ip/Ix) of P to the transition metal element (X) is from 0 to 20% as measured by the following method for measuring coefficient of variation. When the average coefficient of variation (CV value) is within the above range, a cathode active material in which P is uniformly present in the particles of the cathode active material and which has excellent cycle characteristics will be obtained.

(Method for Measuring Coefficient of Variation)

With respect to three cathode active materials, the cross section of each cathode active material is scanned with an electron probe microanalyzer (hereinafter referred to as "EPMA") at 2 μm intervals in a diameter direction with a spot diameter of 2 μm to measure the calculated peak intensity (Ip) of P and the calculated peak intensity (Ix) of the transition metal element (X); and then the calculated peak intensity ratio (Ip/Ix) of P to the transition metal element (X) at each measurement spot is obtained, the coefficients of variation (CV values) of the calculated peak intensity ratio (Ip/Ix) of the respective cathode active materials are calculated, and their average is determined.

The cross section of the cathode active material in the method for measuring coefficient of variation may be obtained, for example, by embedding the cathode active material in an epoxy resin and exposing a smooth cross section of the cathode active material by mechanical polishing. It is preferred to coat the obtained cross section with carbon in a thickness of from 10 to 50 nm, whereby electrical conductivity may be imparted.

EPMA is an apparatus to carry out compositional analysis in a microregion (spot) to which an electron beam is applied, by measuring characteristics X-rays obtainable by applying an accelerated electron beam to an object. By carrying out linear analysis along a diameter direction of the cross section of the cathode active material by EPMA, the concentration distribution of the specific element may be measured at each spot along the diameter direction of the cross section of the cathode active material.

To obtain the calculated peak intensity in measurement by EPMA, a background intensity is subtracted from the peak intensity, and the obtained value is divided by a current value, and its unit is cps/μA. Further, the coefficient of variation (%) of the calculated peak intensity ratio (Ip/Ix) with respect to one cathode active material is calculated by dividing the standard deviation of the average calculated peak intensity ratio (Ip/Ix) of the respective measurement spots of the one cathode active material by the average calculated peak intensity ratio (Ip/Ix), and multiplying the obtained value by 100.

The average coefficient of variation (CV values) of the cathode active material of the present invention as determined by the above method for measuring coefficient of variation is from 0 to 20%, preferably from 0 to 15%, particularly preferably from 0 to 10%. When the average coefficient of variation is at most the upper limit, P is uniformly distributed in the cathode active material, and a high discharge capacity and excellent cycle characteristics will be obtained.

The average calculated peak intensity ratio (Ip/Ix) of each cathode active material is preferably from 0.001 to 0.1, more preferably from 0.001 to 0.07, particularly preferably from 0.001 to 0.05. When the average calculated peak intensity ratio (Ip/Ix) is at least the lower limit, excellent cycle characteristics will be obtained. When the average calculated peak intensity ratio (Ip/Ix) is at most the upper limit, a decrease in the discharge capacity due to an impurity phase resulting from P may be suppressed.

In the cathode active material of the present invention, the ratio (Li/X) of the number of moles of Li to the number of moles of the transition metal element (X) is preferably at least 1.1 times, more preferably at least 1.1 times and at most 1.6 times, particularly preferably at least 1.1 times and at most 1.4 times. When the Li/X is at least 1.1 times and at most 1.6 times, a higher discharge capacity will be obtained.

In the cathode active material of the present invention, the ratio (P/X) of the number of moles of P to the number of moles of the transition metal element (X) is preferably from 0.01 to 10 mol %, more preferably from 0.1 to 5 mol %, particularly preferably from 0.5 to 3 mol %. When the P/X is at least the lower limit, excellent cycle characteristics are likely to be obtained. When the P/X is at most the upper limit, excellent electrical characteristics are likely to be obtained.

The cathode active material of the present invention is preferably a compound (1) represented by the following formula (1):

$$Li_{1+a}P_bNi_cCo_dMn_eO_{2+f} \quad (1)$$

wherein a to e satisfy $0.1 \leq a \leq 0.6$, $0.001 \leq b \leq 0.1$, $0.1 \leq c \leq 0.5$, $0 \leq d \leq 0.3$, $0.2 \leq e \leq 0.9$, $0.9 \leq c+d+e \leq 1.05$ and f is a value determined by valencies of Li, P, Ni, Co and Mn.)

The compound (1) has a high effect to suppress the decrease in the discharge voltage by the cycle, by b satisfying $0.001 \leq b \leq 0.1$. The reason why the effect is obtained is not clearly understood, and is considered to be because a change in the crystal structure by the cycle is suppressed by P being precipitated on the crystal interface of the cathode active material.

a in the compound (1) is more preferably $0.1 \leq a \leq 0.4$, whereby a cathode active material having a high initial discharge capacity and a high initial discharge voltage will be obtained.

b in the compound (1) is more preferably $0.005 \leq b \leq 0.03$, whereby both initial discharge capacity and cycle characteristics are satisfied.

c in the compound (1) is more preferably $0.15 \leq c \leq 0.45$, particularly preferably $0.2 \leq c \leq 0.4$, from the same reason as a.

d in the compound (1) is more preferably $0 \leq d \leq 0.2$, particularly preferably $0 \leq d \leq 0.15$, from the same reason as a.

e in the compound (1) is more preferably $0.35 \leq e \leq 0.85$, particularly preferably $0.4 \leq e \leq 0.8$, from the same reason as a.

The cathode active material of the present invention is considered to have excellent cycle characteristics and to have a small decrease in the discharge voltage, since P is uniformly distributed even in the interior of the cathode active material, whereby the effect by P is effectively achieved. Whereas conventional cathode active materials containing P as disclosed in Patent Documents 2 and 3 are considered to have a small effect by P and to hardly have excellent cycle characteristics, since P is unevenly present on the surface of the cathode active material.

The discharge voltage retention of the cathode active material of the present invention is preferably at least 94%, more preferably at least 95%, particularly preferably at least 96%. The discharge voltage retention is measured under conditions as disclosed in Examples.

<Process for Producing Cathode Active Material>

The process for producing a cathode active material of the present invention comprises the following steps (I) to (IV).

[Step (I)]

In the step (I), a sulfate (A) and a carbonate (B) are mixed in an aqueous solution state. As the case requires, additives may further be used. By this step, a coprecipitated compound containing a transition metal element (X) is precipitated.

The state in which the sulfate (A) and the carbonate (B) are mixed in an aqueous solution state is not particularly limited so long as the sulfate (A) and the carbonate (B) are in states of aqueous solutions when mixed.

Specifically, it is preferred to continuously add an aqueous solution of the sulfate (A) and an aqueous solution of the carbonate (B) to a reactor, whereby the coprecipitated compound is likely to be precipitated, and the particle size will readily be controlled. It is preferred that deionized water, pure water, distilled water or the like is preliminarily put in the reactor, and it is more preferred that the pH is controlled with the carbonate (B), the after-mentioned additives or the like.

In a case where two or more types of sulfates (A) are used, two or more types of aqueous solutions respectively containing the two or more types of sulfates (A) may be used, or one type of an aqueous solution containing the two or more types of sulfates (A) may be used. Further, an aqueous solution containing one type of sulfate (A) and an aqueous solution containing two or more types of sulfates (A) may be used in combination. The same applies to a case where two types of carbonates (B) are used.

The sulfate (A) is at least one sulfate selected from the group consisting of a sulfate of Ni, a sulfate of Co and a sulfate of Mn.

The sulfate of Ni may, for example, be nickel(II) sulfate hexahydrate, nickel(II) sulfate heptahydrate or ammonium nickel(II) sulfate hexahydrate.

The sulfate of Co may, for example, be cobalt(II) sulfate heptahydrate or ammonium cobalt(II) sulfate hexahydrate.

The sulfate of Mn may, for example, be manganese(II) sulfate pentahydrate, or ammonium manganese(II) sulfate hexahydrate.

The sulfate (A) may be used alone or in combination of two or more.

The sulfate (A) preferably contains a sulfate of Ni and a sulfate of Mn, more preferably contains a sulfate of Ni, a sulfate of Co and a sulfate of Mn in combination, whereby a lithium ion secondary battery having a high discharge capacity will readily be obtained. That is, the coprecipitated compound is preferably a carbonate containing Ni and Mn as the transition metal elements (X), more preferably a carbonate containing Ni, Co and Mn as the transition metal elements (X).

The carbonate (B) is at least one member selected from the group consisting of sodium carbonate and potassium carbonate. The carbonate (B) also has a role as a pH adjusting agent to coprecipitate Ni, Co and Mn.

As the carbonate (B), either one of sodium carbonate and potassium carbonate may be used alone, or sodium carbonate and potassium carbonate may be used in combination.

The amount of Ni contained in the sulfate of Ni is preferably from 10 to 50 mol %, more preferably from 15 to 45 mol %, particularly preferably from 20 to 45 mol % based on the total amount (100 mol %) of Ni, Co and Mn contained in the sulfate (A). When the proportion of the amount of Ni is at least the lower limit, a cathode active material exhibiting a high discharge voltage will be obtained. When the proportion of the amount of Ni is at most the upper limit, a cathode active material exhibiting a high discharge capacity will be obtained.

The amount of Co contained in the sulfate of Co is preferably from 0 to 30 mol %, more preferably from 0 to 20 mol %, particularly preferably from 0 to 15 mol % based on the total amount (100 mol %) of Ni, Co and Mn contained in the sulfate (A). When the proportion of the amount of Co is at most the upper limit, a cathode active material exhibiting excellent cycle characteristics will be obtained.

The amount of Mn contained in the sulfate of Mn is preferably from 20 to 90 mol %, more preferably from 35 to 85 mol %, particularly preferably from 40 to 80 mol % based on the total amount (100 mol %) of Ni, Co and Mn contained in the sulfate (A). When the proportion of the amount of Mn is at least the lower limit, a cathode active material exhibiting a high discharge capacity will be obtained. When the proportion of the amount of Mn is at most the upper limit, the cathode active material exhibiting a high discharge voltage will be obtained.

The concentration of the transition metal element (X) in the aqueous solution of the sulfate (A) is preferably from 0.1 to 3 mol/kg, more preferably from 0.5 to 2.5 mol/kg. When the concentration is at least the lower limit, high productivity will be obtained. When the concentration is at most the upper limit, the sulfate (A) will sufficiently be dissolved.

In a case where at least two types of aqueous solutions containing the sulfate (A) are used, the concentration of the transition metal element (X) in each aqueous solution is preferably within the above range.

The concentration of the carbonate (B) in the aqueous solution of the carbonate (B) is preferably from 0.1 to 2 mol/kg, more preferably from 0.5 to 2 mol/kg. When the concentration of the carbonate (B) is within the above range, the coprecipitated compound is likely to be precipitated.

In a case where at least two types of aqueous solutions containing the sulfate (B) are used, the concentration of the sulfate (B) in each aqueous solution is preferably within the above range.

The solvent of the aqueous solution of the sulfate (A) and the aqueous solution of the carbonate (B) may be water alone or may be an aqueous medium containing water and in addition, a component other than water, so long as the sulfate (A) and the carbonate (B) are dissolved.

The component other than water may, for example, be methanol, ethanol, 1-propanol, 2-propanol or a polyol. The polyol may, for example, be ethylene glycol, propylene glycol, diethylene glycol, dipropylene glycol, polyethylene glycol, butanediol or glycerin.

The proportion of the component other than water in the aqueous medium is preferably from 0 to 20 mass %, more preferably from 0 to 10 mass %, particularly preferably from 0 to 1 mass %, and it is most preferred that such a component is not contained. When the proportion of the component other than water is at most the upper limit, such is preferred in view of the environment, the handling efficiency and the cost.

Mixing of the aqueous solution of the sulfate (A) with the aqueous solution of the carbonate (B) is preferably carried out with stirring in a reactor.

A stirring apparatus may, for example, be Three-One Motor. A stirring blade may, for example, be an anchor type, propeller type or paddle type stirring blade.

The temperature of the solution mixture when the aqueous solution of the sulfate (A) and the aqueous solution of the carbonate (B) are mixed is preferably from 20 to 80° C., more preferably from 25 to 60° C., whereby the coprecipitated compound is likely to be precipitated.

Further, mixing of the aqueous solution of the sulfate (A) with the aqueous solution of the carbonate (B) is carried out preferably in a nitrogen atmosphere or in an argon atmosphere, with a view to suppressing oxidation of the precipitated coprecipitated compound, particularly preferably in a nitrogen atmosphere in view of the cost.

The pH of the solution mixture when the aqueous solution of the sulfate (A) and the aqueous solution of the carbonate (B) are mixed is preferably from 7 to 12, more preferably from 7.5 to 10. When the pH is within the above range, the coprecipitated compound is likely to be precipitated.

To the solution mixture, for example, in order to adjust the pH or the solubility of the transition metal element (X), ammonia, ammonium chloride, ammonium sulfate, ammonium nitrate or the like may be added.

The preferred ranges of the proportions of Ni, Co and Mn in the obtained coprecipitated compound are respectively the same as the preferred ranges of the proportions of Ni, Co and Mn in all the sulfates (A) used, whereby a coprecipitated compound in the form of spherical particles having an appropriate particle size is likely to be obtained.

The particle size (D50) of the coprecipitated compound is preferably from 5 to 20 µm, more preferably from 5 to 18 µm, particularly preferably from 7 to 15 µm. When the particle size (D50) of the coprecipitated compound is within the above range, the particle size (D50) of the cathode active material obtainable in the after-mentioned step (IV) is readily be controlled to be within a preferred range, and a cathode active material exhibiting sufficient battery characteristics is likely to be obtained.

The particle size (D50) of the coprecipitated compound is measured by a method disclosed in Examples in the same manner as the particle size (D50) of the cathode active material.

The specific surface area of the coprecipitated compound is preferably from 50 to 300 $m^2/g$, more preferably from 100 to 250 $m^2/g$. When the specific surface area of the coprecipitated compound is within the above range, the aqueous phosphate solution is likely to infiltrate into the interior of the particles in the after-mentioned step (II), and a cathode active material exhibiting a high discharge capacity and high cycle characteristics is likely to be obtained.

The specific surface area of the coprecipitated compound is measured in the same manner as the specific surface area of the cathode active material.

The step (I) preferably includes a step of removing the aqueous solution by filtration or centrifugal separation after the coprecipitated compound is precipitated. For filtration or centrifugal separation, a pressure filter, a vacuum filter, a centrifugal classifier, a filter press, a screw press or a rotary dehydrator may, for example, be used.

The obtained coprecipitated compound is preferably washed in order to remove impurity ions. As a method of washing the coprecipitated compound, for example, a method of repeating pressure filtration and dispersion in distilled water may, for example, be mentioned.

The coprecipitated compound may be dried as the case requires after washing. The temperature for drying the coprecipitated compound is preferably from 60 to 200° C., more preferably from 80° C. to 130° C. When the drying temperature is at least the lower limit, the coprecipitated compound may be dried in a short time. When the drying temperature is at most the upper limit, oxidation of the coprecipitated compound will be suppressed.

The time for drying the coprecipitated compound is preferably from 1 to 300 hours, more preferably from 5 to 120 hours.

[Step (II)]

In the step (II), the coprecipitated compound obtained in the step (I) and an aqueous phosphate solution are mixed.

As a method of mixing the coprecipitated compound with the aqueous phosphate solution, for example, a spray coating method or a dipping method may, for example, be mentioned. Particularly, preferred is a spray coating method, whereby a phosphate will more uniformly be imparted to the coprecipitated compound.

In the case of spray-coating the coprecipitated compound with the aqueous phosphate solution, it is more preferred to spray-coat the coprecipitated compound with the aqueous phosphate solution with stirring, or to spray-coat the coprecipitated compound with the aqueous phosphate solution, followed by stirring.

To stir the coprecipitated compound and the aqueous phosphate solution, a lodige mixer, a rocking mixer, a nauta mixer, a spiral mixer, a spray dryer or a V mixer may, for example, be used.

Further, the coprecipitated compound may be spray-coated with the aqueous phosphate solution in a state where the coprecipitated compound is spread thin.

The aqueous phosphate solution is preferably an aqueous solution of phosphoric acid or ammonium phosphate, more preferably an aqueous solution of at least one member selected from the group consisting of phosphoric acid, ammonium dihydrogen phosphate and diammonium hydrogen phosphate, particularly preferably an aqueous solution of ammonium dihydrogen phosphate, whereby components other than P are likely to be volatilized by firing in the step (IV) and hardly remain in an obtainable cathode active material.

The concentration of the phosphate in the aqueous phosphate solution is preferably from 0.1 to 50 mass %, more preferably from 1 to 30 mass %, particularly preferably from 1 to 20 mass %. When the concentration of the phosphate is at least the lower limit, the phosphate will readily be imparted uniformly to the coprecipitated compound. When the concentration of the phosphate is at most the upper limit, the phosphate will readily be dissolved sufficiently in the aqueous solution.

In the step (II), the ratio (P/X) of the total number of moles of P contained in the phosphate to the total number of moles of the transition metal element (X) contained in the coprecipitated compound is preferably from 0.01 to 10 mol %, more preferably from 0.1 to 5 mol %, particularly preferably from 0.5 to 3 mol %. When the P/X is at least the lower limit, a cathode active material exhibiting excellent cycle characteristics is likely to be obtained. When the P/X is at most the upper limit, impurities hardly form after firing in the step (IV), and excellent electrical characteristics are likely to be obtained.

[Step (III)]

In the step (III), a water content is evaporated from the mixture of the coprecipitated compound and the aqueous phosphate solution obtained in the step (II) to obtain a precursor compound.

The step (III) may be carried out simultaneously with the step (II), or the step (III) may be carried out after the step (II). If the step (III) is not carried out, a large amount of a water content remains in the precursor compound. If a large amount of a water content remains in the precursor compound, lithium carbonate is likely to be dissolved in the water content in the after-mentioned step (IV), and by firing in the step (IV), agglomeration of lithium carbonate is likely to occur. If agglomeration of lithium carbonate occurs, distribution of Li and P in an obtainable cathode active material tends to be non-uniform, and a cathode active material having sufficient cycle characteristics may not be obtained.

The water content remaining in the precursor compound obtained in the step (III) is preferably at most 30 mass %, more preferably at most 15 mass %, particularly preferably at most 5 mass % based on the total mass of the precursor compound, with a view to suppressing the above-mentioned advance effect.

The amount of the remaining water content may be measured by a Karl Fischer method.

As a method of volatilizing the water content, for example, a drying method by heating may be mentioned.

The heating temperature in the step (III) is preferably from 60 to 200° C., more preferably from 80 to 130° C. When the heating temperature is at least the lower limit, the amount of the water content in the obtained precursor compound tends to be small, and a cathode active material exhibiting excellent cycle characteristics is likely to be obtained. When the heating temperature is at most the upper limit, the precursor compound is hardly thermally-deteriorated.

The heating time varies depending upon the heating temperature and is preferably from 1 to 300 hours, more preferably from 1 to 120 hours.

[Step (IV)]

In the step (IV), the precursor compound obtained in the step (III) and lithium carbonate are mixed and fired at from 500 to 1,000° C.

As a method of mixing the precursor compound with lithium carbonate, for example, a method using e.g. a rocking mixer, a nauta mixer, a spiral mixer, a cutter mill or a V mixer may be mentioned.

In the step (IV), the precursor compound and lithium carbonate are preferably mixed so that the ratio (Li/X) of the total number of moles of Li contained in lithium carbonate to the total number of moles of the transition metal element (X) contained in the precursor compound is at least 1.1 times. When the ratio is at least the lower limit, a high discharge capacity will be obtained.

The ratio (Li/X) of the total number of moles of Li contained in lithium carbonate is more preferably at least 1.1 times and at most 1.6 times, particularly preferably at least 1.1 times and at most 1.4 times. When the Li/X is at most the upper limit, a high discharge capacity will be obtained.

As a firing apparatus, an electric furnace, a continuous firing furnace or a rotary kiln may, for example, be used. Firing is preferably carried out in the air, particularly preferably while supplying the air, whereby the precursor compound is oxidized during firing.

The rate of supply of the air is preferably from 10 to 200 mL/min, more preferably from 40 to 150 mL/min per 1 L of the internal capacity of the furnace.

By supplying the air during firing, the transition metal element (X) in the precursor compound is sufficiently oxidized, whereby a cathode active material having high crystallinity and having a desired crystal phase will be obtained.

The firing temperature is from 500 to 1000° C., preferably from 600 to 1000° C., particularly preferably from 800 to 950° C. When the firing temperature is within the above range, a cathode active material having high crystallinity will be obtained.

The firing time is preferably from 4 to 40 hours, more preferably from 4 to 20 hours.

Firing may be carried out by one-step firing at from 500 to 1000° C. or may be carried out by two-step firing comprising temporary firing at from 400 to 700° C. and main firing at from 700 to 1000° C. Firing is preferably carried out by the two-step firing, whereby Li is likely to be uniformly dispersed in an obtainable cathode active material.

The temperature for temporary firing in the case of the two-step firing is preferably from 400 to 700° C., more preferably from 500 to 650° C. Further, the temperature for main firing in the case of the two-step firing is preferably from 700 to 1000° C., more preferably from 800 to 950° C.

The reason why the cathode active material obtained by the production process of the present invention has excellent cycle characteristics and has a small decrease in the discharge voltage is not clear, but is considered as follows. Since the specific surface area of the coprecipitated compound obtained in the step (I) is large, when the coprecipitated compound and the aqueous phosphate solution are mixed in the step (II), the aqueous solution will uniformly infiltrate even into the interior of pores of the coprecipitated compound, and thus a cathode active material in which P is uniformly dispersed and distributed even in the interior of particles is obtained by firing in the step (IV).

<Cathode for Lithium Ion Secondary Battery>

The cathode for a lithium ion secondary battery of the present invention comprises a cathode current collector and a cathode active material layer formed on the cathode current collector. The cathode for a lithium ion secondary battery of the present invention is the same as a known cathode except that the cathode active material of the present invention is used.

[Cathode Current Collector]

The cathode current collector may, for example, be an aluminum foil or a stainless steel foil.

[Cathode Active Material Layer]

The cathode active material layer in the cathode for a lithium ion secondary battery of the present invention is a layer comprising the cathode active material of the present invention, an electrically conductive material and a binder. The cathode active material layer may contain another component such as a thickener as the case requires.

The electrically conductive material may, for example, be a carbon black such as acetylene black, graphite or ketjen black. The electrically conductive material may be used alone or in combination of two or more.

The binder may, for example, be a fluorinated resin (such as polyvinylidene fluoride or polytetrafluoroethylene), a polyolefin (such as polyethylene or polypropylene), a polymer or copolymer having unsaturated bonds (such as a styrene/butadiene rubber, an isoprene rubber or a butadiene rubber) or an acrylic acid polymer or copolymer (such as an acrylic copolymer or a methacrylic copolymer). The binder may be used alone or in combination of two or more.

The cathode active material of the present invention may be used alone or in combination of two or more.

The thickener may, for example, be carboxymethyl cellulose, methyl cellulose, hydroxymethyl cellulose, ethyl cellulose, polyvinyl alcohol, oxidized starch, phosphorylated starch, casein or polyvinylpyrrolidone. The thickener may be used alone or in combination of two or more.

[Method for Producing Cathode for Lithium Ion Secondary Battery]

As a method for producing the cathode for a lithium ion secondary battery of the present invention, a known production method may be employed except that the cathode active material of the present invention is used. For example, as a method for producing the cathode for a lithium ion secondary battery of the present invention, the following method may be mentioned.

The cathode active material of the present invention, the electrically conductive material and the binder are dissolved or dispersed in a medium to obtain a slurry, or the cathode active material of the present invention, the electrically conductive material and the binder are kneaded with a medium to obtain a kneaded product. Then, the obtained slurry or kneaded product is applied on the cathode current collector e.g. by coating to form the cathode active material layer.

<Lithium Ion Secondary Battery>

The lithium ion secondary battery of the present invention comprises the above-described cathode for a lithium ion secondary battery of the present invention, an anode and a non-aqueous electrolyte.

[Anode]

The anode comprises an anode current collector and an anode active material layer containing an anode active material, formed on the anode current collector.

The anode current collector may, for example, be a metal foil such as a nickel foil or a copper foil.

The anode active material may be any material so long as it is capable of absorbing and desorbing lithium ions at a relatively low potential. It may, for example, be a lithium metal, a lithium alloy, a carbon material, an oxide composed mainly of a metal in Group 14 or 15 of the periodic table, a silicon carbide compound, a silicon oxide compound, titanium sulfide or a boron carbide compound. Further, as the anode active material, an oxide such as iron oxide, ruthenium oxide, molybdenum oxide, tungsten oxide, titanium oxide or tin oxide, or a nitride may, for example, be used.

The carbon material as the anode active material may, for example, be non-graphitizable carbon, artificial graphite, natural graphite, thermally decomposed carbon, cokes (such as pitch coke, needle coke or petroleum coke), graphites, glassy carbons, an organic polymer compound fired product obtained by firing and carbonizing an organic polymer compound (such as a phenol resin or a furan resin) at an appropriate temperature, carbon fibers, activated carbon or carbon blacks.

The metal in Group 14 of the periodic table may, for example, be Si or Sn. The metal in Group 14 of the periodic table is preferably Si.

The anode may be produced, for example, in such a manner that the anode active material is mixed with an organic solvent to prepare a slurry, and the prepared slurry is applied to the anode current collector, followed by drying and pressing.

The non-aqueous electrolyte may, for example, be a non-aqueous electrolytic solution in which an electrolyte salt is dissolved in an organic solvent, a solid electrolyte containing an electrolyte salt, a polymer electrolyte, or a solid or gelled electrolyte in which an electrolyte salt is mixed with or dissolved in e.g. a polymer compound.

As the organic solvent, a conventional organic solvent known for a non-aqueous electrolytic solution may be employed, and it may, for example, be propylene carbonate, ethylene carbonate, diethyl carbonate, dimethyl carbonate, 1,2-dimethoxyethane, 1,2-diethoxyethane, γ-butyrolactone, diethyl ether, sulfolane, methyl sulfolane, acetonitrile, an acetic acid ester, a butylic acid ester or a propionic acid ester. Particularly, from the viewpoint of the voltage stability, the organic solvent is preferably a cyclic carbonate such as propylene carbonate, or a chain-structured carbonate such as dimethyl carbonate or diethyl carbonate. The organic solvent may be used alone or in combination of two or more.

The solid electrolyte may be any material so long as it has lithium ion conductivity, and either one of an inorganic solid electrolyte and a polymer solid electrolyte may be used.

The inorganic solid electrolyte may, for example, be lithium nitride or lithium iodide.

The polymer solid electrolyte may be an electrolyte containing an electrolyte salt and a polymer compound in which the electrolyte salt is dissolved. The polymer compound in which the electrolyte salt is dissolved may, for example, be an ether polymer compound (such as poly(ethylene oxide) or a crosslinked product of poly(ethylene oxide)) or an ester polymer compound (such as poly(methacrylate) or poly(acrylate)).

As the matrix of the gelled electrolyte may be any one so long as it is gelled upon absorption of the non-aqueous electrolytic solution, and various polymers may be employed. The polymer compound may, for example, be a fluorinated polymer compound (such as poly(vinylidene fluoride) or poly(vinylidene fluoride-co-hexafluoropropylene)), polyacrylonitrile, a copolymer of polyacrylonitrile, or an ether polymer compound (such as polyethylene oxide, a copolymer of polyethylene oxide, or a crosslinked product of the copolymer). As a monomer to be copolymerized with polyethylene oxide to obtain the copolymer, methyl methacrylate, butyl methacrylate, methyl acrylate or butyl acrylate may, for example, be mentioned.

As the matrix of the gelled electrolyte, a fluorinated polymer compound is particularly preferred among the polymer compounds in view of the stability against the redox reaction.

As the electrolyte salt, any one of those commonly used for lithium ion secondary batteries may be used. For example, $LiClO_4$, $LiPF_6$, $LiBF_4$ or $CF_3SO_3Li$ may be mentioned.

The shape of the lithium ion secondary battery of the present invention is not particularly limited and may be suitably selected depending on the intended use from e.g. a coin-shape, a sheet-form (film-form), a folded shape, a wound cylinder with bottom and a button shape.

EXAMPLES

Now, the present invention will be described in detail with reference to Examples, but it should be understood that the present invention is by no means restricted to such specific Examples. Ex. 1 to 9 are Examples of the present invention, and Ex. 10 to 16 are Comparative Examples.

[Particle Size (D10, 50, 90)]

The cathode active material was sufficiently dispersed in water by ultrasonic treatment, and by measurement by a laser diffraction/scattering type particle size distribution measuring apparatus (MT-3300EX manufactured by Nikkiso Co., Ltd.), frequency distribution and an accumulative volume distribution curve were obtained to obtain a volume-based particle size distribution. The particle size at a point of 50% on the obtained accumulative volume distribution curve was taken as the particle size (D50). Further, the particle size (D10) which was the particle size at a point of 10% and the particle size (D90) which was the particle size at a point of 90% on the obtained accumulative volume distribution curve were also calculated.

[Specific Surface Area]

The specific surface areas of the coprecipitated compound and the cathode active material were measured by means of a BET (Brunauer, Emmett, Teller) method using a specific surface area measuring apparatus (HM model-1208 manufactured by MOUNTECH Co., Ltd.).

[Compositional Analysis (Ni, Co, Mn, P and Li)]

Compositional analysis of the cathode active material was carried out by a plasma emission spectrometer (model: SPS3100H manufactured by SII NanoTechnology Inc.).

[Measurement of Coefficient of Variation]

The cathode active material was embedded in an epoxy resin, a smooth cross section of the cathode active material was exposed by mechanical polishing, and the exposed cross section was carbon-coated with a thickness of 30 nm to form a cross section of the cathode active material. The cathode active material cross section was scanned at 2 μm intervals in a diameter direction under conditions of an accelerating voltage of 15 kV, an irradiation current of 30 nA and a spot diameter of 2 μm using FE-EPMA (JXA-8500F manufactured by JEOL Ltd.), to measure the calculated peak intensity (Ix) of the transition metal element (X) and the calculated peak intensity (Ip) of P at each measurement spot. For spectroscopic analysis of Kα1 characteristic X-ray of Ni and Kα1 characteristic X-ray of Mn, as the analyzing crystal, LIFH manufactured by JEOL Ltd. was used. For spectroscopic analysis of Kα1 characteristic X-ray of Co, LIF manufactured by JEOL Ltd. was used. Further, for spectroscopic analysis of Kα1 characteristic X-ray of P, TAP manufactured by JEOL Ltd. was used. One example of measurement results, results in the after-mentioned Ex. 12 are shown in FIG. 1.

Figure 1:
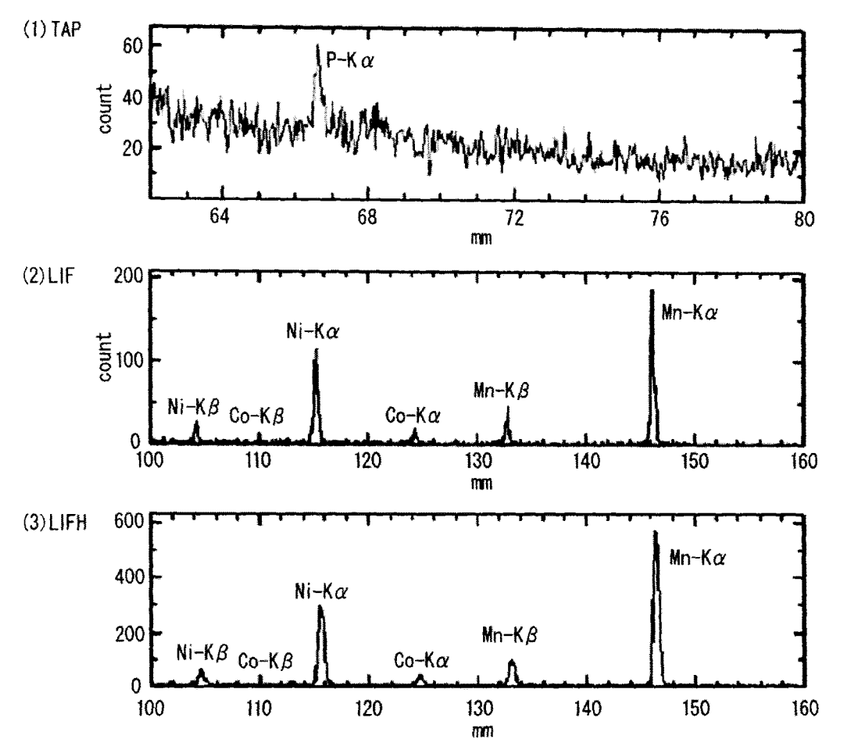
FIG. 1 is spectral charts obtained by measurement by EPMA in Ex. 12.

As evident from FIG. 1, counts at 115.600 mm for the Kα1 characteristic X-ray of Ni, at 124.300 mm for the Kα1 characteristic X-ray of Co, at 146.450 mm for the Kα1 characteristic X-ray of Mn, and at 66.650 mm for the Kα1 characteristic X-ray of P were employed as peak intensities.

With respect to one cathode active material, the calculated peak intensity ratios (Ip/Ix) of P to the transition metal element (X) at the respective measurement spots were obtained, and their average and the standard deviation were obtained. Then, the standard deviation of the average calculated peak intensity ratio (Ip/Ix) was divided by the average calculated peak intensity ratio (Ip/Ix) and then multiplied by 100 to calculate the coefficient of variation (CV value) (%) of the calculated peak intensity ratio (Ip/Ix).

In the same manner, the coefficients of variation (CV value) of the calculated peak intensity ratio (Ip/Ix) of three cathode active materials in total were calculated, and their average was obtained.

Further, the average calculated peak intensity ratio (Ip/Ix) of each cathode active material was obtained.

Ex. 1

Step (I):

Nickel(II) sulfate hexahydrate, cobalt(II) sulfate heptahydrate and manganese(II) sulfate pentahydrate were dissolved in distilled water so that the molar ratio of Ni, Co and Mn would be as shown in Table 1, and that the total amount of the sulfates would be 1.5 mol/kg, to prepare 2 kg of an aqueous sulfate solution. Further, 99.1 g of ammonium sulfate was dissolved in 900.9 g of distilled water to prepare a 0.75 mol/kg aqueous ammonia solution. Further, 381.2 g of sodium carbonate was dissolved in 2018.8 g of distilled water to prepare an aqueous carbonate solution (pH adjusting solution).

Then, into a 2 L baffle-equipped glass reactor, distilled water was put and heated to 50° C. by a mantle heater, and the aqueous sulfate solution and the aqueous ammonia solution were added respectively at rates of 5.0 g/min and 0.5 g/min for 6 hours with stirring by a paddle type stirring blade, to precipitate a coprecipitated compound containing Ni, Co and Mn. During addition of the aqueous sulfate solution, the aqueous carbonate solution (pH adjusting solution) was added so as to keep the pH in the reactor to be 8.0. Further, during the precipitation reaction, the liquid was continuously withdrawn using filter cloth so that the liquid amount in the reactor would not exceed 2 L.

In order to remove impurity ions from the obtained coprecipitated compound, pressure filtration and dispersion in distilled water were repeated to wash the precipitated compound. Washing was completed at a point where the electrical conductivity of the filtrate became 20 mS/m, and drying was carried out at 120° C. for 15 hours to obtain a coprecipitated compound. Of the obtained coprecipitated compound, the specific surface area and the results of compositional analysis of Ni, Co and Mn are shown in Table 1.

Step (II) and Step (III):

18 g of the obtained coprecipitated compound was spray-coated with an aqueous solution having 0.17 g of ammonium dihydrogen phosphate dissolved in 3.6 g of distilled water so that the ratio of the total content of P contained in the phosphate based on the total amount (100 mol %) of the transition metal element (X) contained in the coprecipitated compound would be 1 mol %, followed by drying at 90° C. for 3 hours to obtain a precursor compound.

Step (IV):

The precursor compound and 7.15 g of lithium carbonate were mixed so that the molar ratio (Li/X) of the total amount of Li contained in lithium carbonate to the total amount of the transition metal element (X) contained in the precursor compound would be 1.275. Further, using an electric furnace (FO510 manufactured by Yamato Scientific Co., Ltd.), while flowing the air at 133 mL/min per 1 L of the internal capacity, the mixture was subjected to temporary firing at 600° C. for 5 hours and then to main firing at 850° C. for 16 hours to obtain a cathode active material.

The particle size (D50) and the specific surface area of the obtained cathode active material are shown in Table 1.

Ex. 2 to 9

Coprecipitated compounds were obtained in the same manner as in Ex. 1 except that in the step (I), the amounts of charge of nickel(II) sulfate hexahydrate, cobalt(II) sulfate heptahydrate and manganese(II) sulfate pentahydrate were changed so that the molar ratio of Ni, Co and Mn would be as shown in Table 1. Further, precursor compounds were obtained in the same manner as in Ex. 1 except that the ratio of the total amount of P contained in the phosphate based on the total amount (100 mol %) of the transition metal element (X) contained in the coprecipitated compound was changed as shown in Table 1. Further, cathode active materials were obtained in the same manner as in Ex. 1 except that the molar ratio of the total amount of Li contained in lithium carbonate to the total amount of the transition metal element (X) contained in the precursor compound was changed as shown in table 1.

The particle sizes (D50) and the specific surface areas of the obtained cathode active materials are shown in Table 1. Further, the average calculated peak intensity ratio (Ip/Ix) and the average coefficient of variation (CV value) of the calculated peak intensity ratios (Ip/Ix) in each of Ex. 2, 3 and 5 are shown in Table 1.

Ex. 10 to 12 and 16

Coprecipitated compounds were obtained in the same manner as in Ex. 1 except that in the step (I), the amounts of charge of nickel(II) sulfate hexahydrate, cobalt(II) sulfate heptahydrate and manganese(II) sulfate pentahydrate were changed so that the molar ratio of Ni, Co and Mn would be as shown in Table 1. Further, precursor compounds were obtained in the same manner as in Ex. 1 except that the ratio of the total amount of P contained in the phosphate to the total amount (100 mol %) of the transition metal element (X) contained in the coprecipitated compound was changed as shown in Table 1, and that drying in the step (III) was not carried out. Further, cathode active materials were obtained in the same manner as in Ex. 1 except that the molar ratio of the total amount of Li contained in lithium carbonate to the total amount of the transition metal element (X) contained in the precursor compound was changed as shown in Table 1.

The particle sizes (D50) and the specific surface areas of the obtained cathode active materials are shown in Table 1.

Ex. 13 and 15

Coprecipitated compounds were obtained in the same manner as in Ex. 1 except that in the step (I), the amounts of charge of nickel(II) sulfate hexahydrate, cobalt(II) sulfate heptahydrate and manganese(II) sulfate pentahydrate were changed so that the molar ratios of Ni, Co and Mn would be as shown in Table 1. Then, the step (II) and the step (III) were not carried out, and mixing with lithium carbonate and firing were carried out in the same manner as in Ex. 1 except that the molar ratio of the total amount of Li contained in lithium carbonate to the total amount of the transition metal element (X) contained in the coprecipitated compound was as shown in Table 1, to obtain cathode active materials.

The particle sizes (D50) and the specific surface areas of the obtained cathode active materials are shown in Table 1. Further, the average calculated peak intensity ratio (Ip/Ix) in Ex. 15 is shown in Table 1.

Ex. 14

A coprecipitated compound was obtained in the same manner as in Ex. 1 except that in the step (I), the amounts of charge of nickel(II) sulfate hexahydrate, cobalt(II) sulfate heptahydrate and manganese(II) sulfate pentahydrate were changed so that the molar ratio of Ni, Co and Mn would be as shown in Table 1. Then, the step (II) and the step (III) were not carried out, and mixing with lithium carbonate and firing were carried out in the same manner as in Ex. 1 except that the molar ratio of the total amount of Li contained in lithium carbonate to the total amount of the transition metal element (X) contained in the coprecipitated compound was as shown in Table 1, to obtain a cathode active material.

Further, 18 g of the obtained cathode active material was spray-coated with an aqueous solution having ammonium dihydrogen phosphate dissolved in 3.6 g of distilled water so that the ratio of the total amount of P contained in the phosphate to the total amount (100 mol %) of the transition metal element (X) contained in the cathode active material would be 1.15 mol %, followed by drying at 90° C. for 2 hours, and firing at 450° C. for 8 hours was carried out using an electric furnace (FO510 manufactured by Yamato Scientific Co., Ltd.), while flowing the air at 1.5 L/min to obtain a cathode active material having particle the surface coated with P.

The particle size (D50) and the specific surface area of the obtained cathode active material having the particle surface coated with P are shown in Table 1. Further, the average calculated peak intensity ratio (Ip/Ix) and the average coefficient of variation (CV values) of the calculated peak intensity ratio (Ip/Ix) are shown in Table 1.

"P/X" in Table 1 means the ratio (mol %) of the content of P contained in the phosphate to the total amount (100 mol %) of the transition metal element (X) contained in the coprecipitated compound in the step (II). Further, in Ex. 14, "P/X" means the ratio (mol %) of the content of P contained in the coating phosphate to the total amount (100 mol %) of the transition metal element (X) contained in the cathode active material. Further, "Li/X" means the molar ratio (molar times) of the total amount of Li contained in lithium carbonate to the total amount of the transition metal element (X) contained in the precursor compound in the step (III). Further, in Ex. 13 to 15, "Li/X" means the molar ratio (molar times) of the total amount of Li contained in lithium carbonate to the total amount of the transition metal element (X) contained in the coprecipitated compound.

TABLE 1

| | Step (I) | | | | | | | | Step (II) | Step (III) | Step (IV) | Cathode active material | | | | | |
|---|---|---|---|---|---|---|---|---|---|---|---|---|---|---|---|---|---|
| | Charge composition [mol %] of sulfate (A) | | | Analysis composition [mol %] of transition metal element (X) | | | Specific surface area | | | | Li/X [molar | Average particle size [μm] | | | Specific surface area | Ip/Ix | Coefficient of variation |
| | Ni | Co | Mn | Ni | Co | Mn | [m²/g] | P/X [mol %] | Drying | times] | D10 | D50 | D90 | [m²/g] | (average) | (average) [%] |
| Ex. 1 | 33 | 4 | 63 | 33 | 4.1 | 62.9 | 158.3 | 1 | Conducted | 1.275 | 7.7 | 10.5 | 15.2 | 10.68 | — | — |
| Ex. 2 | 33 | 4 | 63 | 33 | 4.1 | 62.9 | 158.3 | 0.5 | Conducted | 1.275 | 7.7 | 10.8 | 18.0 | 8.31 | 0.011 | 6.5 |
| Ex. 3 | 33 | 4 | 63 | 33 | 4.1 | 62.9 | 158.3 | 1 | Conducted | 1.275 | 7.7 | 10.5 | 15.2 | 8.92 | 0.016 | 7.5 |
| Ex. 4 | 33 | 4 | 63 | 33 | 4.1 | 62.9 | 158.3 | 1.5 | Conducted | 1.275 | 7.7 | 10.6 | 15.3 | 11.88 | — | — |
| Ex. 5 | 33 | 4 | 63 | 33 | 4.1 | 62.9 | 158.3 | 3 | Conducted | 1.275 | 7.7 | 10.6 | 15.3 | 12.65 | 0.036 | 10.8 |
| Ex. 6 | 33 | 4 | 63 | 33 | 4.1 | 62.9 | 158.3 | 1 | Conducted | 1.260 | 7.7 | 10.5 | 15.2 | 4.04 | — | — |
| Ex. 7 | 33 | 4 | 63 | 33 | 4.1 | 62.9 | 158.3 | 1 | Conducted | 1.306 | 7.8 | 10.7 | 15.4 | 6.45 | — | — |
| Ex. 8 | 33 | 4 | 63 | 33 | 4.1 | 62.9 | 158.3 | 1 | Conducted | 1.320 | 7.7 | 10.6 | 15.4 | 6.95 | — | — |
| Ex. 9 | 20 | 15 | 65 | 19.3 | 15 | 65.7 | 91.3 | 1 | Conducted | 1.460 | 7.9 | 10.5 | 14.7 | 6.27 | — | — |

TABLE 1-continued

| | Step (I) | | | | | | | | | | | Step | | Cathode active material | | | | | |
|---|---|---|---|---|---|---|---|---|---|---|---|---|---|---|---|---|---|---|---|
| | Charge composition [mol %] of sulfate (A) | | | Analysis composition [mol %] of transition metal element (X) | | | Specific surface area | Step (II) P/X | Step (III) | (IV) Li/X [molar | | Average particle size [μm] | | | Specific surface area | Ip/Ix | Coefficient of variation (average) |
| | Ni | Co | Mn | Ni | Co | Mn | [m²/g] | [mol %] | Drying | times] | D10 | D50 | D90 | [m²/g] | (average) | [%] |
| Ex. 10 | 33 | 2 | 65 | 33.2 | 2.1 | 64.8 | 144.1 | 1 | Nil | 1.290 | 6.9 | 10.3 | 18.4 | 9.35 | — | — |
| Ex. 11 | 25 | 12.5 | 62.5 | 25.8 | 12.4 | 62.8 | 115.1 | 1 | Nil | 1.335 | 8.7 | 12.4 | 18.5 | 6.65 | — | — |
| Ex. 12 | 20 | 15 | 65 | 19.3 | 15 | 65.7 | 91.3 | 1 | Nil | 1.430 | 7.9 | 10.4 | 14.3 | 7.45 | — | — |
| Ex. 13 | 33 | 2 | 65 | 33.2 | 2.1 | 64.8 | 144.1 | — | — | 1.290 | 6.9 | 10.2 | 17.7 | 9.36 | — | — |
| Ex. 14 | 33 | 2 | 65 | 33.2 | 2.1 | 64.8 | 144.1 | — | — | 1.290 | 6.9 | 10.1 | 17.8 | 3.72 | 0.012 | 115.3 |
| Ex. 15 | 33 | 4 | 63 | 33 | 4.1 | 62.9 | 158.3 | — | — | 1.275 | 7.6 | 10.6 | 15.6 | 7.62 | 0.000 | — |
| Ex. 16 | 33 | 4 | 63 | 33 | 4.1 | 62.9 | 158.3 | 1 | Nil | 1.275 | 7.6 | 10.7 | 17.4 | 9.45 | — | — |

[Evaluation of Cycle Characteristics]

(Production of Cathode Sheet)

Each of the cathode active materials obtained in Ex., acetylene black as an electrical conductive material and polyvinylidene fluoride (binder) were added to N-methyl-pyrrolidone in a mass ratio of 80:10:10 to prepare a slurry.

Then, the slurry was applied on one side of an aluminum foil (cathode current collector) having a thickness of 20 μm by means of a doctor blade, followed by drying at 120° C. and then by roll pressing twice to prepare a cathode sheet.

(Production of Lithium Ion Secondary Battery)

Using a circle having a diameter of 18 mm punched out from the obtained cathode sheet as a cathode, a stainless steel simple sealed cell type lithium ion secondary battery was assembled in an argon glove box. A stainless steel plate having a thickness of 1 mm was used as an anode current collector, and a metal lithium foil having a thickness of 500 μm was formed on the anode current collector to obtain an anode. Further, as a separator, a porous polypropylene having a thickness of 25 μm was used. Further, as an electrolytic solution, a solution having $LiPF_6$ dissolved at a concentration of 1 mol/dm³ in a solvent mixture of ethylene carbonate (EC) and diethyl carbonate (DEC) in a mass ratio of 1:1 was used.

(Measurement of Discharge Capacity Retention and Discharge Voltage Retention)

The obtained lithium ion secondary battery was connected to a charge and discharge evaluation apparatus (manufactured by TOYO SYSTEM Co., Ltd., apparatus name: TOSCAT-3000), and charged and discharged with a load current of 20 mA per 1 g of the cathode active material to carry out an activation treatment. Then, a charge/discharge cycle of charging to 4.5 V with a load current of 200 mA per 1 g of the cathode active material and discharging to 2 V with a load current of 200 mA per 1 g of the cathode active material, was repeated 100 times.

The discharge capacity at the time of the activation treatment was taken as "the initial discharge capacity", the discharge capacity in the 100th cycle was taken as "the discharge capacity after cycles", and the ratio of the discharge capacity after cycles to the discharge capacity in the third cycle was taken as "the initial capacity retention". Further, the average discharge voltage at the time of the activation treatment was taken as "the initial discharge voltage", the average discharge voltage in the 100th cycle was taken as "the discharge voltage after cycles", and the ratio of the discharge voltage after cycles to the discharge voltage in the third cycle was taken as "the discharge voltage retention".

The results of measuring the initial discharge capacity and the discharge voltage, the discharge voltage after cycles and the discharge voltage, and the discharge capacity retention and the discharge voltage retention in Ex. are shown in Table 2.

TABLE 2

| | Initial | | After cycles | | Discharge capacity retention [%] | Discharge voltage retention [%] |
|---|---|---|---|---|---|---|
| | Discharge capacity [mAh/g] | Discharge voltage [V] | Discharge capacity [mAh/g] | Discharge voltage [V] | | |
| Ex. 1 | 194.5 | 3.63 | 158.2 | 3.38 | 81.3 | 96.3 |
| Ex. 2 | 198.1 | 3.65 | 162.4 | 3.40 | 82.0 | 96.0 |
| Ex. 3 | 192.0 | 3.64 | 157.2 | 3.38 | 81.9 | 96.2 |
| Ex. 4 | 185.5 | 3.60 | 148.6 | 3.34 | 80.1 | 96.1 |
| Ex. 5 | 168.8 | 3.56 | 136.1 | 3.28 | 80.6 | 96.0 |
| Ex. 6 | 188.2 | 3.61 | 151.1 | 3.35 | 80.3 | 96.1 |
| Ex. 7 | 189.4 | 3.65 | 157.6 | 3.39 | 83.3 | 96.1 |
| Ex. 8 | 195.1 | 3.65 | 162.1 | 3.40 | 83.1 | 96.2 |
| Ex. 9 | 211.1 | 3.60 | 171.0 | 3.30 | 81.0 | 95.6 |
| Ex. 10 | 186.9 | 3.65 | 151.8 | 3.36 | 81.2 | 93.6 |
| Ex. 11 | 196.8 | 3.61 | 161.6 | 3.33 | 82.1 | 92.6 |
| Ex. 12 | 211.0 | 3.58 | 168.8 | 3.29 | 80.0 | 95.3 |
| Ex. 13 | 200.0 | 3.60 | 155.9 | 3.39 | 78.0 | 90.6 |

TABLE 2-continued

| | Initial | | After cycles | | Discharge capacity retention [%] | Discharge voltage retention [%] |
|---|---|---|---|---|---|---|
| | Discharge capacity [mAh/g] | Discharge voltage [V] | Discharge capacity [mAh/g] | Discharge voltage [V] | | |
| Ex. 14 | 186.6 | 3.62 | 150.4 | 3.26 | 80.6 | 94.3 |
| Ex. 15 | 196.5 | 3.68 | 152.7 | 3.40 | 77.7 | 92.0 |
| Ex. 16 | 191.7 | 3.62 | 147.5 | 3.36 | 77.0 | 92.7 |

As shown in Table 2, the lithium ion secondary batteries in Ex. 1 to 9 had a high discharge voltage retention as compared with the lithium ion secondary batteries in Ex. 10 to 16, had a discharge capacity retention equal to or higher than those in Ex. 10 to 16, and had excellent cycle characteristics.

INDUSTRIAL APPLICABILITY

According to the present invention, a cathode active material for a lithium ion secondary battery having a high discharge capacity and having excellent cycle characteristics is obtained. The cathode active material is suitably used for forming a cathode for a lithium ion secondary battery to be used for a small sized light weight lithium ion secondary battery for electronic instruments such as cell phones or for vehicles.

What is claimed is:

1. A cathode active material, comprising:
Li;
P; and
at least one transition metal element (X) selected from the group consisting of Ni, Co, and Mn;
wherein the material satisfies formula (1):

wherein $0.1 \leq a \leq 0.6$, $0.001 \leq b \leq 0.1$, $0.1 \leq c \leq 0.5$, $0 \leq d \leq 0.3$, $0.2 \leq e \leq 0.9$, $0.9 \leq c+d+e \leq 1.05$, and f is a value determined from the valences of Li, P, Ni, Co, and Mn
wherein:
an average coefficient of variation (CV value) of a calculated peak intensity ratio (Ip/Ix) of P to the transition metal element (X) is from 0 to 20%; and
the average CV value is determined by:
scanning a cross section of each of three samples of the cathode active material with an electron probe microanalyzer at 2 μm intervals in a diameter direction with a spot diameter of 2 μm to measure a calculated peak intensity (Ip) of P and a calculated peak intensity (Ix) of the transition metal element (X) and determine the calculated peak intensity ratio (Ip/Ix) of P to the transition metal element (X) at each measurement spot;
determining CV values of the calculated peak intensity ratio (Ip/Ix) for each sample; and
determining the average CV value of the samples.

2. A process for producing the cathode active material according to claim 1, which comprises the following steps (I) to (IV):
(I) a step of mixing at least one sulfate (A) selected from the group consisting of a sulfate of Ni, a sulfate of Co and a sulfate of Mn, with at least one carbonate (B) selected from the group consisting of sodium carbonate and potassium carbonate in an aqueous solution state to obtain a coprecipitated compound containing at least one transition metal element (X) selected from the group consisting of Ni, Co and Mn;
(II) a step of mixing the coprecipitated compound with an aqueous phosphate solution;
(III) a step of volatilizing a water content from the mixture of the coprecipitated compound and the aqueous phosphate solution to obtain a precursor compound; and
(IV) a step of mixing the precursor compound with lithium carbonate and firing the mixture at from 500 to 1000° C.

3. The process for producing a cathode active material according to claim 2, wherein in the step (I), the concentration of the transition metal element (X) in the aqueous solution of the sulfate (A) is from 0.1 to 3 mol/kg, and the concentration of the carbonate (B) in the aqueous solution of the carbonate (B) is from 0.1 to 2 mol/kg.

4. The process for producing a cathode active material according to claim 2, wherein in the step (I), the pH of the solution mixture is from 7 to 12 when the aqueous solution of the sulfate (A) and the aqueous solution of the carbonate (B) are mixed.

5. The process for producing a cathode active material according to claim 2, wherein the coprecipitated compound in the step (I) is a carbonate containing Ni, Co and Mn.

6. The process for producing a cathode active material according to claim 2, wherein in the step (II), mixing of the coprecipitated compound and the aqueous phosphate solution is carried out by a spray coating method.

7. The process for producing a cathode active material according to claim 2, wherein the aqueous phosphate solution in the step (II) and the step (III) is an aqueous solution of at least one member selected from the group consisting of phosphoric acid, ammonium dihydrogen phosphate and diammonium hydrogen phosphate.

8. The process for producing a cathode active material according to claim 2, wherein in the step (II), the ratio (P/X) of the total number of moles of P contained in the phosphate to the total number of moles of the transition metal element (X) contained in the coprecipitated compound is from 0.01 to 10 mol%.

9. The process for producing a cathode active material according to claim 2, wherein in the step (IV), the ratio (Li/X) of the total number of moles of Li contained in the lithium carbonate to the total number of moles of the transition metal element (X) contained in the precursor compound is at least 1.1 times.

10. The cathode active material according to claim 1, wherein an average of the calculated peak intensity ratios (Ip/Ix) of each sample is from 0.001 to 0.1.

11. The cathode active material according to claim 1, wherein:
a ratio (Li/X) of a number of moles of Li to a number of moles of the transition metal element (X) is at least 1.1 times; and a ratio (P/X) of a number of moles of P to the number of moles of the transition metal element (X) is from 0.01 to 10 mol%.

12. A cathode for a lithium ion secondary battery, comprising a cathode current collector and a cathode active material layer formed on the cathode current collector;
   wherein the cathode active material layer comprises the cathode active material as defined in claim 1, an electrically conductive material, and a binder.

13. A lithium ion secondary battery, comprising the cathode for a lithium ion secondary battery according to claim 12, an anode, and a non-aqueous electrolyte.

14. The cathode active material according to claim 1, wherein the transition metal element (X) comprises Co.

* * * * *